Patented Feb. 2, 1932

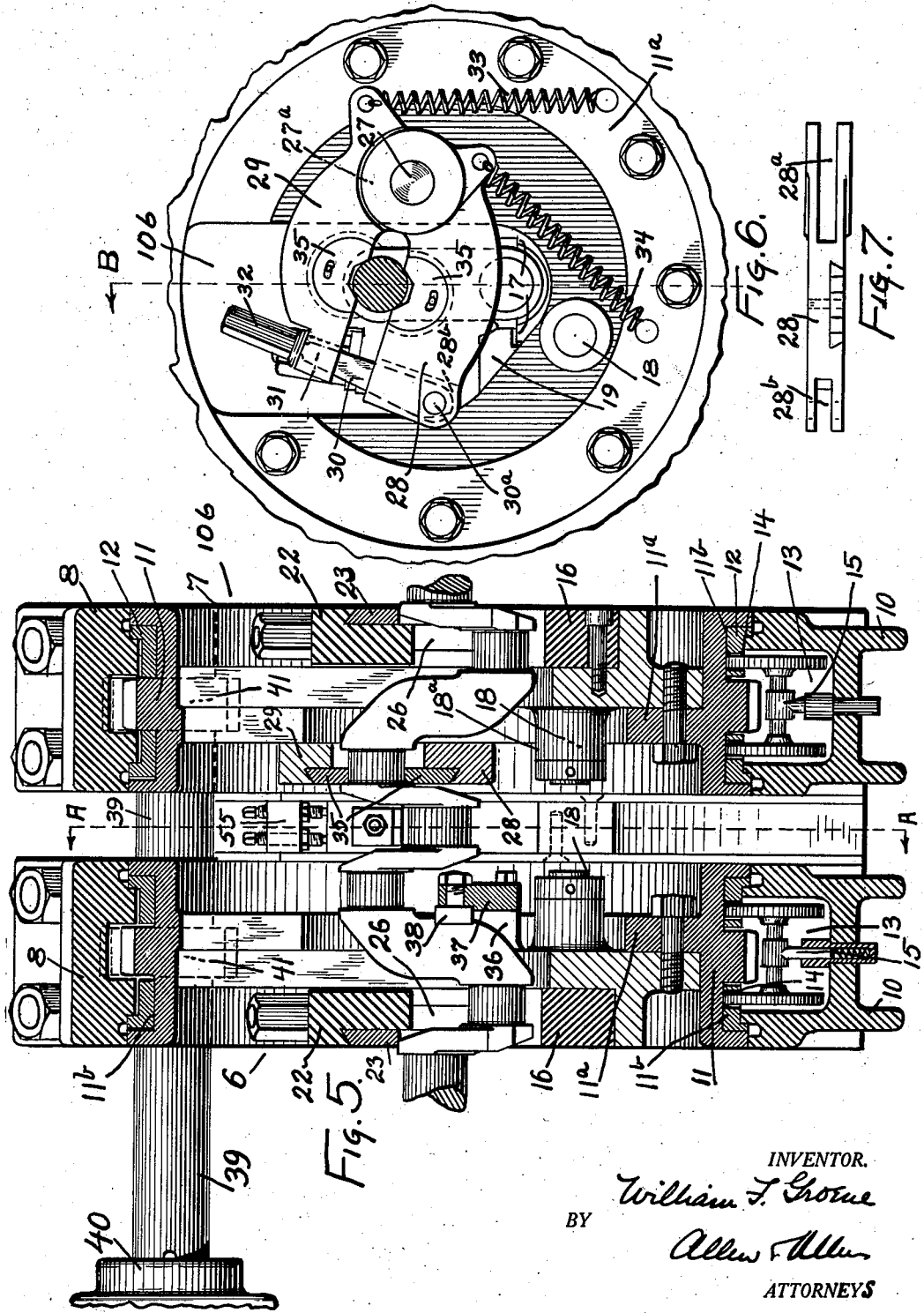

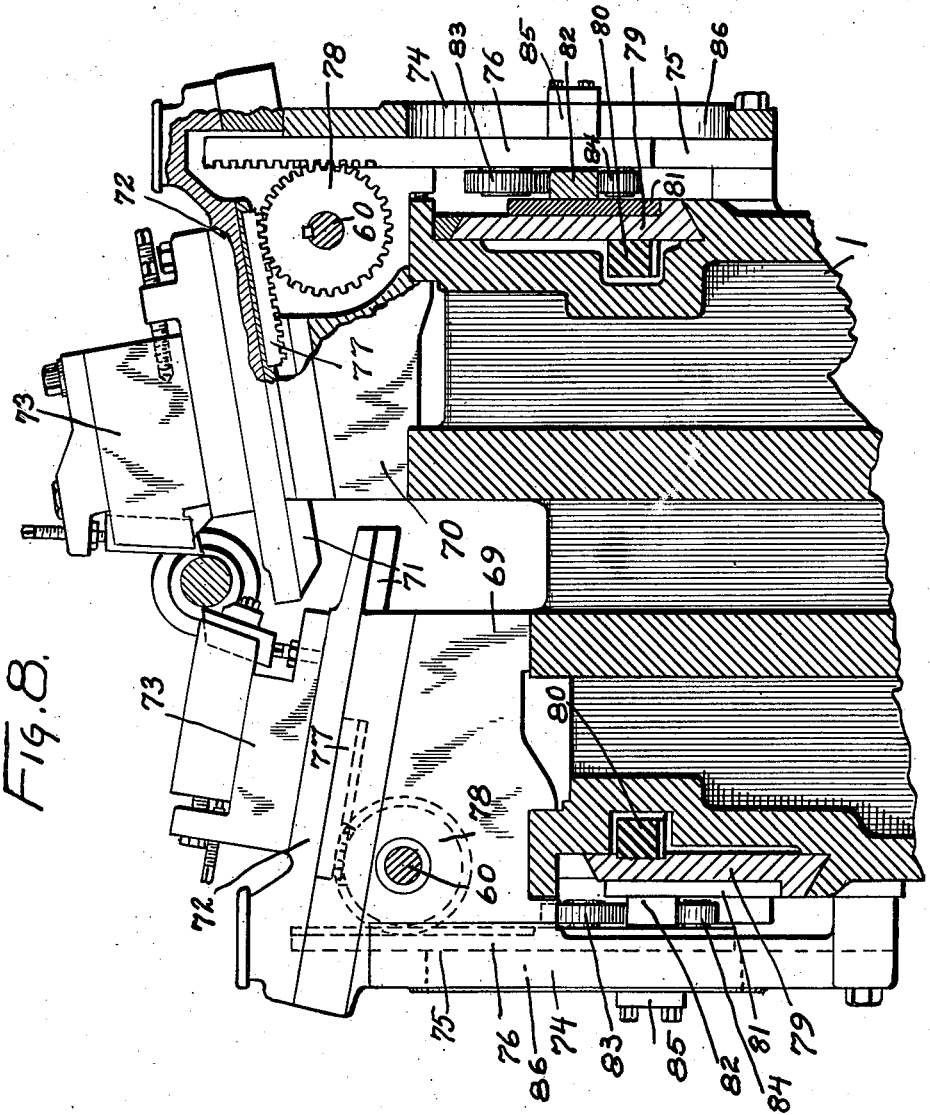

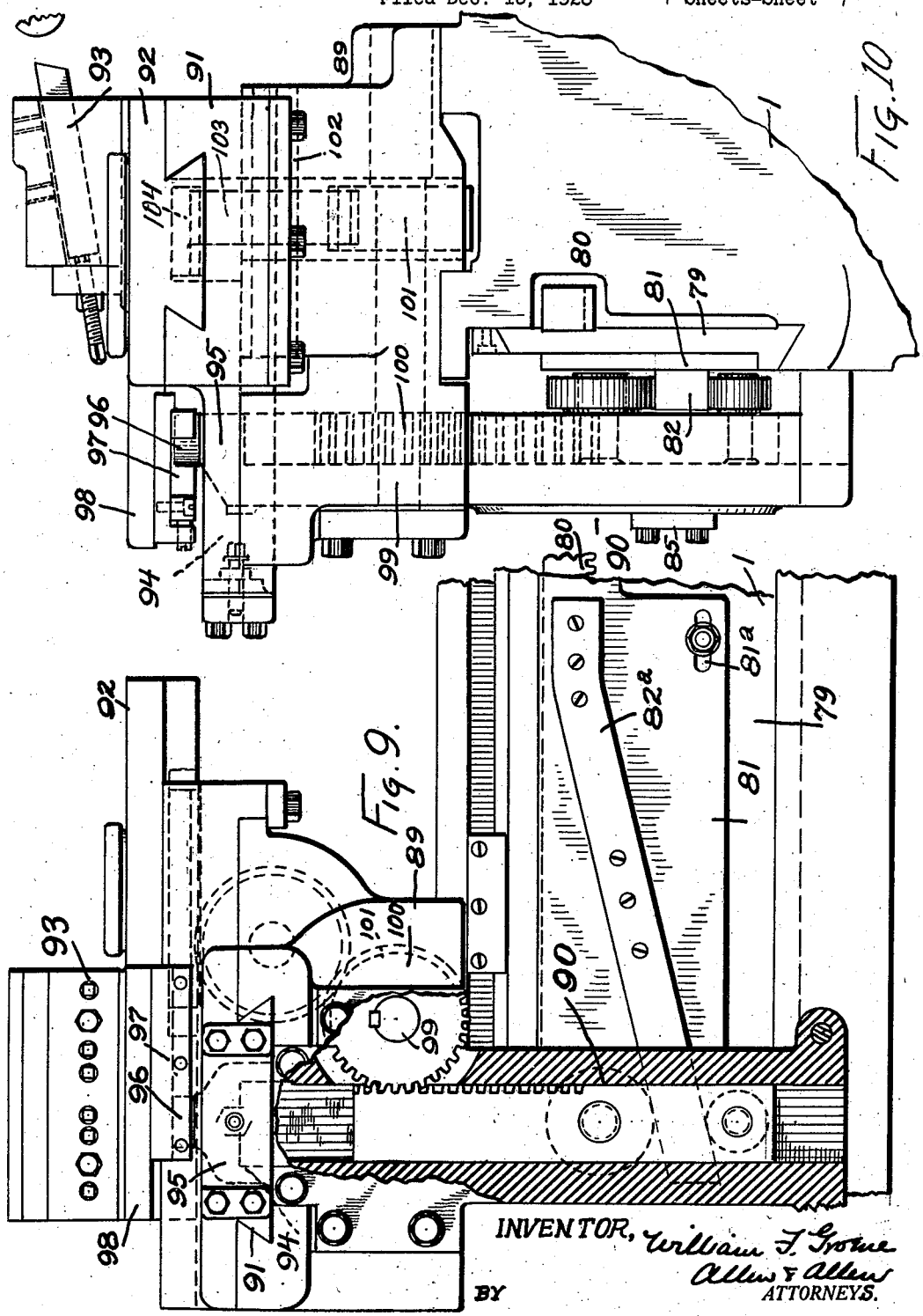

1,843,359

UNITED STATES PATENT OFFICE

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE

DOUBLE CENTER DRIVE CRANK-SHAFT LATHE    REISSUED

Application filed December 15, 1928. Serial No. 326,352.

This invention relates to a novel method and the machinery for turning, in one turning operation, the flange end, the stub end, and the line bearings of a crank-shaft, whether the crank-shaft in question be a 4, a 6, or an 8 throw crank-shaft.

It also consists of a novel arrangement of tools and of methods for feeding these tools to and away from the work and in synchronization with each other, both in approach, turning and retreat from the work.

There is also a novel arrangement of a pair of driving chucks at the center of the work, and of a method for centering, positioning, clamping, steadying and driving the work with and in these chucks.

A still further arrangement is one whereby the center tool units are supported by the two driving chuck housings and whereby the feed of the tools in this center tool holder is obtained by a novel driving arrangement from another set of tool units.

It also consists of a novel tool slide having a two-way feed.

There is also a loading and unloading arrangement having an ability to receive the work, to carry the same into the chuck, to an exact position of placement, lowering to the operation position, a disengaging feature and a retreat during the turning operations.

There is also a novel steady rest for holding the work for torsional strains during the turning operations.

Each of these features will be fully described in the descriptions to follow and other new and novel features pointed out, the invention being set forth in the appended claims.

The system outlined provides the following possibilities for the turning of the various types of crank-shafts now in use in the internal combustion engines of the present day.

It provides for the turning, in one operation, of the flange end, including the first or No. 1 line bearing, the No. 2 or center line bearing, and the stub end including the No. 3 line bearing, of a four-throw or seven bearing crank-shaft.

The system also lends itself to the turning of ten-bearing or six-throw crank-shafts, as well as thirteen-bearing or eight-throw crank-shafts.

In the instance of the first mentioned crank-shaft—the seven-bearing—the turning of the flange and stub end is coincident with that of the three-line bearings, the No. 2 line or center bearing being turned by a separate set of tools from those that operate on the flange and No. 1 bearing and the stub end and the No. 3 bearing; there being six sets of tools employed as follows:—A front and rear set operating on the flange end and the No. 1 line bearing, a central front and rear set which operate on the No. 2 or center line bearing, and a front and rear set which operate on the stub end and the No. 3 line bearing, all of which operate upon the crank-shaft simultaneously to perform their turning operations.

Upon a six-throw crank-shaft having but three main bearings, the problems of turning are the same as the four-throw crank-shaft, the line bearings being in the same position as in a four-throw shaft.

A ten-bearing or six-throw shaft having four line bearings and six connecting rod bearings presents a slightly different proposition in that there is one more central bearing to consider. The method then is to turn the flange end and No. 1 bearing with one group of tools; turn the Nos. 2 and 3 center bearings with a second group of tools; and turn the stub end and the No. 4 bearing with a third group of tools. All of the groups of tools coming into action at the same time and completing, in one action, the turning of the flange and stub ends together with the four-line bearings.

In the drawings:—

Figure 5 is a vertical transverse section of the chucks and center tool unit on lines "B" of Figures 2, 3, 4 and 6.

Figure 6 is a fragmentary elevation of the right hand center drive unit, viewed from the left side.

Figure 7 is a plan of the lower half of the clamping elements shown in Figure 6.

Figure 8 is a vertical transverse section on lines "C" of Figures 1 and 2, of the flange end front and rear tool assembly.

Figure 9 is a front elevation, partly in section, of the front stub end tool slide.

Figure 10 is a vertical side elevation of the same.

Figure 1:
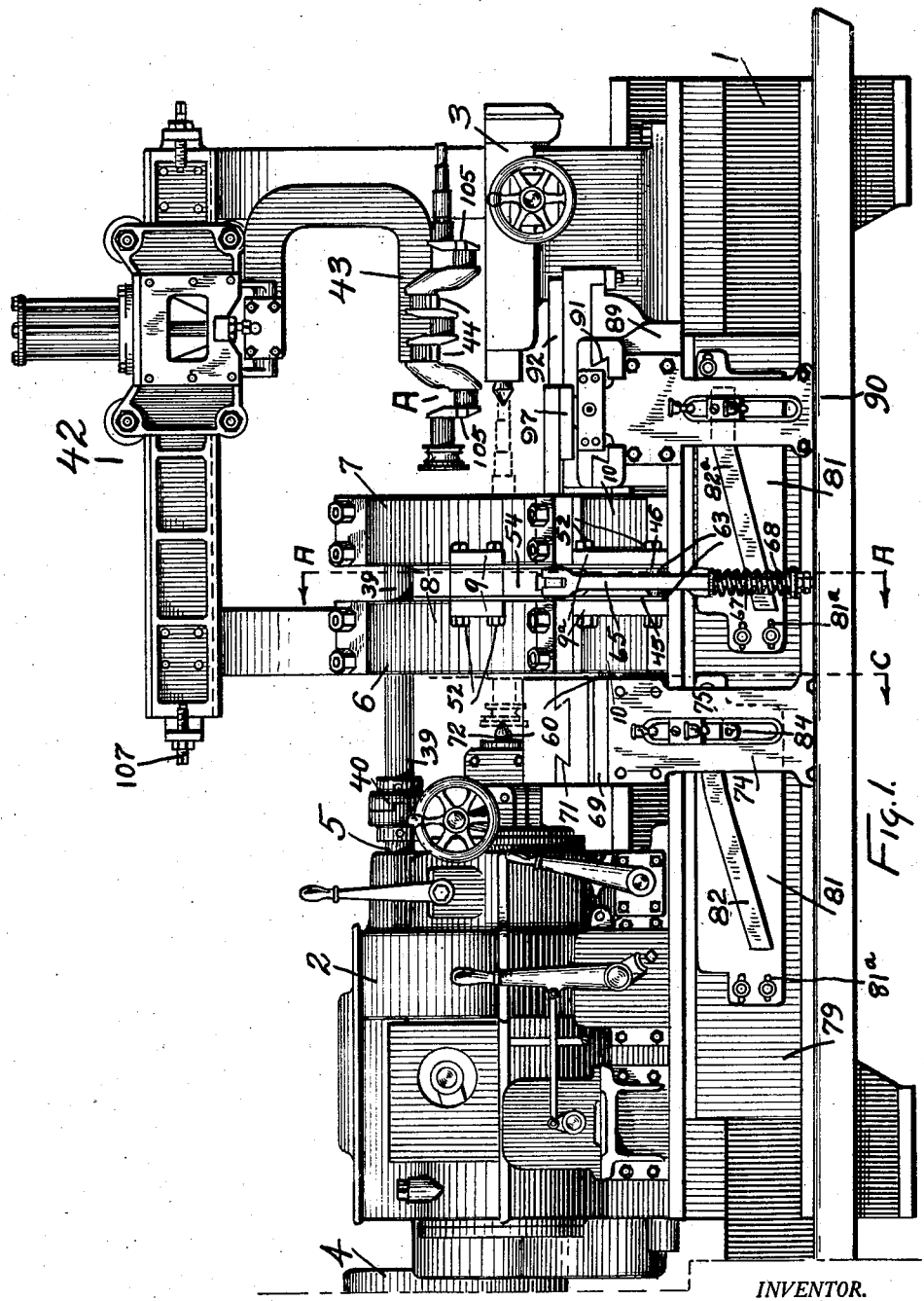
Figure 1 is a front elevation with the tool holders left off the tool slides on the stub and flange ends.
Figure 2:
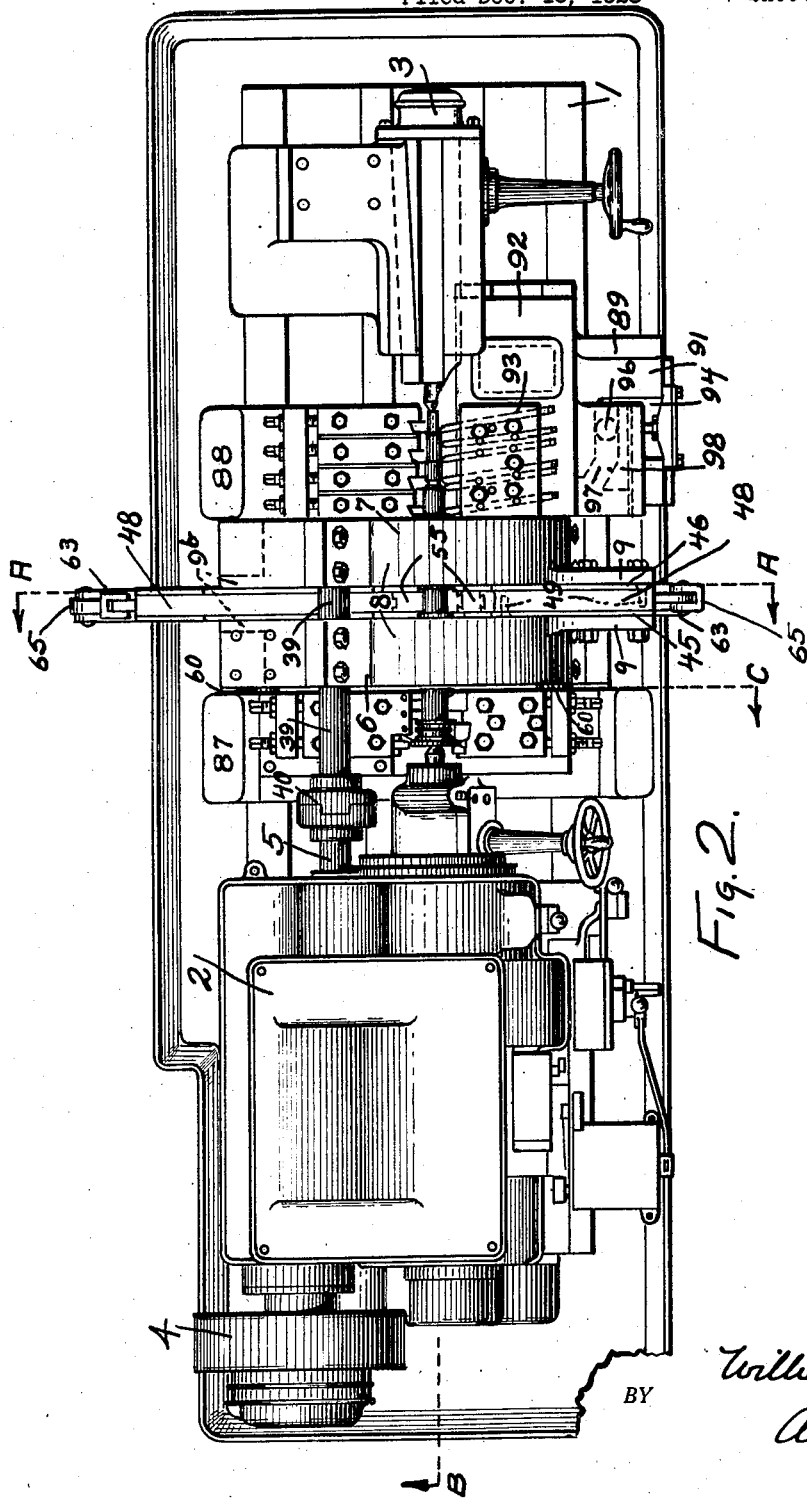
Figure 2 is a plan of the lathe.

Referring to Figures 1 and 2, the bed of a lathe is shown at 1 and has a headstock 2, of a well known type, having an adjustable center carried by its spindle. The tailstock 3 is of a known type, carrying also the usual adjustable center. The headstock carries a driving pulley 4 to which a source of power may be applied. A shaft 5, driven by the gearing within the head, furnishes driving power to a unit of the machine as will be described later.

The chucking mechanism

A driving chuck frame 6, carrying a chuck of the rotary type is located near the center of the lathe, and this chuck will hereinafter be called the flange end chuck, since its function is to grip a web of the crank-shaft on the flange end side of the chuck. A similar chuck frame 7 carries what will be hereinafter called the stub end chuck, because it engages a web toward the stub end of the shaft, is mounted on the bed, fairly close to the chuck frame 6, the spacing being sufficient to expose the center bearing of a crank shaft to be turned. Caps 8, forming the upper half of each of the driving chuck frames 6 and 7, are bolted fast to lower parts 10 of the respective frames which are secured to the bed, thus forming circular containers for the chucks. The respective chuck frame caps have on their front edge flanges 9 and 9a, and the lower halves 10 of the chuck frames have on their rear edges webs 9b the utility of which will be described later. As each of the chucks are the same in general, I will describe the details of the stub end chuck and then point out the differences in the flange end chuck, using the same numbers for like parts in the two chucks.

Figure 3:
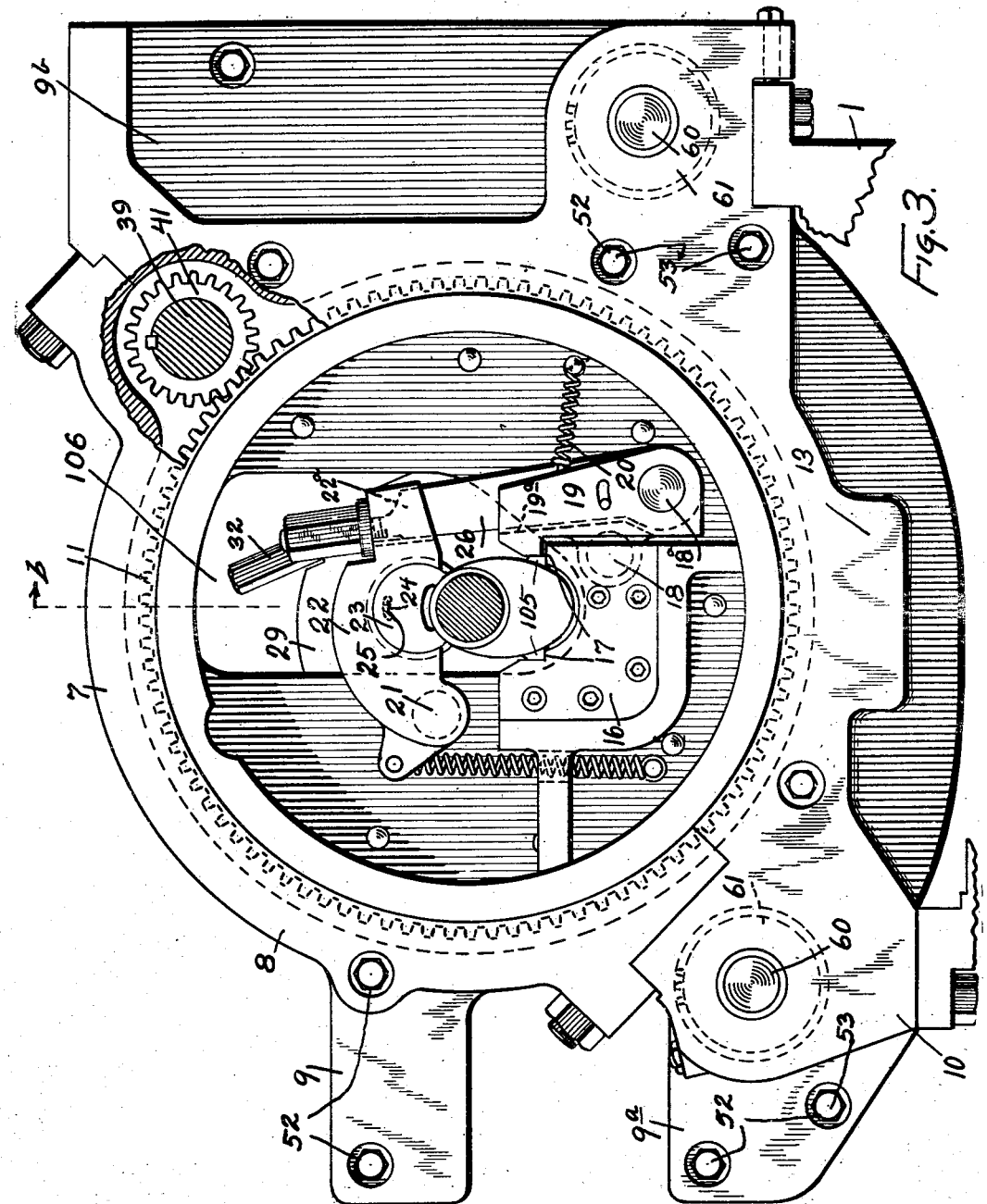
Figure 3 is a side view, partly in section, of one of the center drive chucks, viewed from the tailstock end of Figure 1.

Referring to Figures 3 and 5, I provide a gear 11 in the form of a ring with flanges extending outwardly from the edge of the gear ring, these flanges having their edges turned upward to form a seat 11b. Bronze bearing rings 12, seated fixedly in the frames 8 and 9, form a continuous bearing for the ring gear 11. The lower frame part 10 has a cavity 13 therein forming an oil reservoir. In order to distribute the lubricant in the reservoir, the bronze rings are provided with slots 14 at their lower parts, and a pair of spring mounted rollers 15 in the oil reservoir have contact with the oil and the said ring gear bearing flanges through the slots 14, thus serving to lubricate the ring gear. A hardened steel positioning block 16 is mounted in a seat carried by the ring gear web 11a, this block having a pair of seats 17, 17. A bearing pin 18 is carried in a boss 18a on the ring gear, and serves to mount a clamping dog 19. A spring 20 secured to the ring gear is used for retracting the clamping dog 19. A second bearing pin 21 is carried in the ring gear web 11a which supports a clamping lever 22 having a bifurcated outer end 22a. A self-aligning disc 23 having a tapered seat is mounted in the clamping lever 22. A slot 24 in the disc 23, and a pin 25 carried by the clamping lever and projecting into the slot in the disc 23, allow a limited circular travel of the disc. The clamping dog 19 is grooved at 19a to retain a link 26 having a bearing at its lower end on the pin 18a which is located in the dog 19 at a point below the bearing of the said clamping dog in the gear ring web 11a, the upper end of the link 26 having a long threaded portion for a nut.

So far the description has been based on the construction shown in the outer face right hand or stub end chuck, and up to this point, the construction of the second or flange end chuck is the same, the differences lying in the inner halves of the two chucks which face each other.

I employ a stud 27 mounted in a boss 27a in the web 11a of the gear ring. A clamping member 28 (Fig. 6) is mounted on the stud 27 and has a forked rear end 28a and a slotted front end 28b (Fig. 7). A second clamping member 29 having a reduced rear portion adapted to fit within the forked portion of the clamping member 28, and having a bifurcated outer end 31 is also mounted on the stud 27. A link 30 mounted on a pin 30a in the lower edge of the clamping member 28, and lying in the slotted portion of the clamping member 28b, has a long threaded upper end upon which is mounted a special long nut 32.

The two clamping members have at their central portion semi-circular discs 35 each having a tapered outer edge for a portion of the circumference and a V-shaped notch with a flat base, for the remaining portion of the circumference (Fig. 6). The tapered portion fits into like seats in the clamping members, thus retaining the discs in the clamping members, while permitting them to travel circumferentially, limited by a stop pin and slot as shown, in the same manner as described with reference to the disc 23. Carried on the rear of the clamping members are ears adapted for engagement with springs 33 and 34. The spring 33, fastened to the clamping member 29, tends to hold it open and away from the work being inserted. The spring 34, fastened to the clamping member 28, is so proportioned as to balance the weight of the clamping member and its parts, and to prevent all but slight dropping from its normal position.

The mechanism just described forms a torsional strain resisting unit. The stud 27, being firmly mounted in the body of the chuck itself with the two clamping members carried by it, with their self-adjusting gripping discs, supplement the other work gripping devices which have been described to form a three-point drive for the work. The construction prevents beyond any possibility, the dislodgment of the work by the tools.

Referring to the left hand or flange end chuck, I have provided a pair of spaced lugs, one of which is shown at 36 (Fig. 5), which are carried by the web of the ring gear 11. A bridge piece 37 is bolted to the lugs 36. A hardened positioning block 38 is securely mounted in the bridge piece 37. The function of this positioning block 38 is to locate the work, a crank-shaft in this instance, endwise with relation to the attacking point of the tools.

In Figures 1, 2, 3, 4, and 5, more especially in Figures 1 and 5, is best shown the driving mechanism for the ring gears. The shaft 39 is coupled at 40 with the shaft 5 located in the headstock of the lathe. This shaft 39 is mounted in bearings carried by the chuck frames 6 and 7 and extends from the coupling on the end of the shaft 5 through both frames and to the far side of the chuck frame 7. At a point opposite the ring gears are fastened driving pinions 41. The shaft 5 being a source of power, the shaft 40 and the two pinions carried by it are driven and in turn drive the ring gears 11, and the chucking parts of the ring gear structure, and these chucking parts will in turn, when properly adjusted to the work, cause the work to rotate at a suitable rate to be operated on by the tools.

Loading operation

The loading and unloading operations of the work require a nicety of handling to the end that the tools be not damaged and that the work, when it is lowered into the chuck members, be in its exact position of placement, so that when various clamping, steadying, and final positioning devices of the chuck come into play, there be a minimum of final adjustment.

Attention is called to a patent issued to me on January 29, 1929, bearing No. 1,700,721, in which patent there is disclosed a loading device for placing a crankshaft in a lathe, in the form of a pneumatic hoisting and lowering crane, and it is the type therein disclosed that is used in the machine herein being described, with a few changes to suit the present lathe and chuck structure.

The loading structure as a whole is indicated at 42, consisting of a frame carried on the lathe bed, a carriage mounted on the frame and free to travel longitudinally thereon, a pair of adjustable stops for the carriage, one at each end of the frame, an arm 43 for holding the work to be inserted in the chuck, and a pneumatic cylinder for raising and lowering the work. It is to be noted that the carrying arm 43 in the present case has a longer reach to enable it to move in past the center of the two driving chucks and is equipped with a pair of hooks 44 on its lower edge and extending laterally therefrom for holding the work for insertion into the chucks.

Center tool unit

Figure 4:
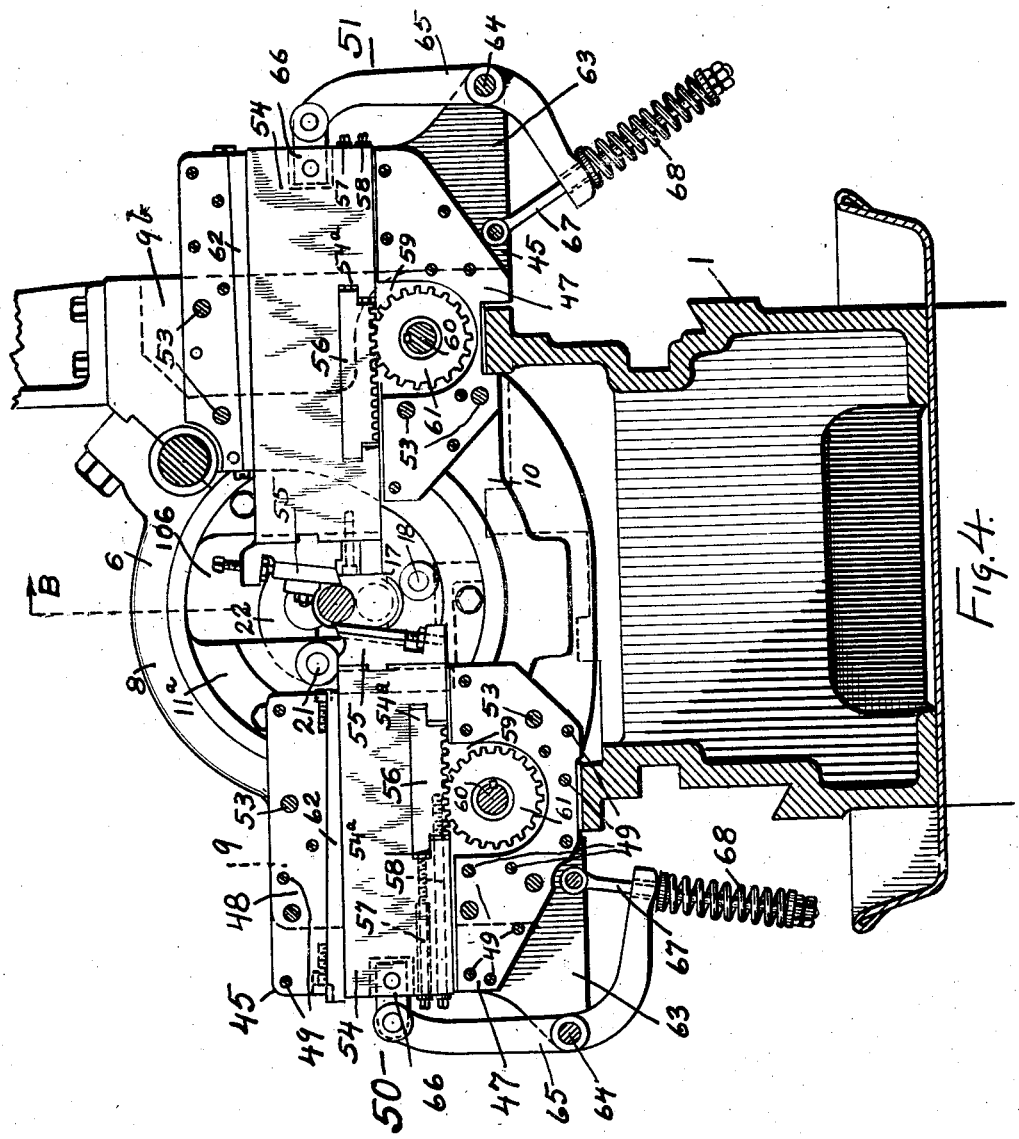
Figure 4 is a vertical transverse section of the center tool unit on lines "A" of Figures 1 and 2, the near side plates being left off and the bolts and rivets shown in section.

The center tool unit is shown in Figures 1, 2, 3, 4, 5 and 6, but especially in Figures 2, 4 and 5. Referring first to the front tool slide, it will be noted that it is formed of two heavy plates 45 and 46 having a lower filler casting 47 and an upper filler casting 48 located between them. The plates 45 and 46, together with the filler castings 47, 48, are assembled in one unit by means of screws 49, and when so assembled, form a tool supporting and guiding unit which I have indicated generally at 50. As the two filler castings do not fill the space vertically, a pocket is formed between them for the mounting of a tool carrying bar.

The flanges 9 and 9a (Figs. 1 and 3) at the front of the chuck frames and the web 9b at the rear of the two chuck frames have a series of bolt holes 52 therein. When the tool unit 50 and its rear counterpart 51 are assembled, they are placed between the two chucking units fitting tightly into position and a series of bolts 53 are inserted in the bolt holes 52, and upon tightening these bolts, the tool carrying units and the chuck frames are clamped into a rigid, single unit of great strength yet readily disassembled for repair or inspection.

Referring again to the tool slide 50, I have provided a flat tool carrying bar 54 mounted in the space in the slide 50 formed between the upper and lower filler castings. This tool bar carries on its inner end a mounting 55, for holding a tool, this mounting being of a familiar design. A rack bar 56 is mounted in a slot in the lower edge of the tool bar 54, which slot has shoulders at the ends which support the ends 54a of the rack bar, this rack having a loose fit endwise and capable of being adjusted and locked in adjusted position by adjusting screws 57, 58, the former being an abutment screw. The adjusting of this rack makes possible close working limits for the tool with the work as well as eliminating back lash.

The lower filler casting 47 has a pocket 59 in which is mounted a gear 61 on a shaft 60, this gear having engagement with the rack 56 whereby, when the gear is turned forward or reverse, the tool is fed into or away from the work. The method of mounting and furnishing power to this shaft will be described below.

A taper gib 62, capable of being adjusted to take up wear, is mounted over the tool bar 54. Extensions 63 on the lower part of the side plate units 45, 46 (Figs. 1, 2 and 3) carry bearings 64 in the outer extremities thereof. A bell crank lever 65, mounted on a shaft in the bearings 64, has its upper end pivoted to a link 66 pivotally mounted in a pocket on the rear of the tool bar 54. A rod 67 is mounted on a pin extending between the lower edges of the side plates 45, 46, this rod, at its lower end, being threaded for a nut and washer and having a spring 68 mounted upon it. The lower end of the bell crank has a bearing upon the spring, the rod passing through a hole in the end of the lever. By adjusting the spring an adjustable tension on the tool bar 54 may be had, and the bell crank rocks on its pivot to accommodate the movement of the tool bar, the purpose of this bell crank arrangement being to eliminate all back lash between the tool bar 54 and the gear 60.

The description of the center tool units has, so far been based on the front tool unit 50. The rear tool unit 51 is, in all of its essential parts, a duplicate of the front tool unit 50 and needs no detailed description.

Tool slides at flange end of lathe

The flange end tool slides are shown in Figures 1, 2 and 8, but particularly in Figure 8. The tool slide supporting bases are shown at 69 and 70 mounted rigidly on the lathe bed 1, and having the usual V's 71 for the tool slides 72. The tool slides carry the tool holders 73. A downwardly extending guide 74 is securely bolted to the outward end of each of the supporting bases 69 and 70, which guide has a groove 75 in the inner face thereof. A rack bar 76 is mounted in each slot, which bar has teeth for a part of its length on its inner face. Racks 77 are mounted on the bottoms of the tool slides 72, and are driven by the shafts 60, heretofore referred to. These shafts are mounted in bearings in the supporting bases 69 and 70, and extend through the bases toward the tailstock and into and through the base of the two chucks 6 and 7, and the gear 61 of the center tool units 50, 51. Gears 78 are secured to the shafts 60, at a point in line with the rack bars 76 and the racks 77 on the tool slides, being in mesh with both racks. It is obvious that any upward movement of the rack piece 76 will cause a rotation of the gear 78 and shaft 60 in each case and the consequent feed of the tool slides through racks 77.

On each side of the machine there is a slide 79 mounted in the bed of the lathe. A rack 80 is secured on the rear of each slide and is driven by a pinion gear, not shown, by power from the headstock gear assembly. Each slide 79 has mounted on its face a cam plate 81 carrying a cam or form bar 82. The plates are capable of being adjusted on the screw and slot mounting 81a, to regulate the timing of the cams, as is usual. The slides 79 on each side of the machine move in unison when in operation. A roller 83 is mounted on the rack piece 76 and extends over the path of the cam and in contact therewith. A second roller 84 acts as a retractor for the rack piece and through its agency, the tools also. A steadying block 85 is provided which travels in a slot 86 in the guide 74 and holds the end of the rack bar secure.

The two slides at the back of the lathe, one at the flange end, and having the general number 87, and the one at the stub end, having the number 88, are to be understood as being to all intents and purposes, substantially identical with the flange end front slide to which the description, as given, has been confined. Therefore, no detail description of these two slides is believed to be needed.

Referring to the shaft 60 carried in the base 69 and passing into and through the bases of the chuck frames, as has been described, it is to be noted that the two gears, 61 in the center tool unit lower halves, and 78 in the tool slide bases, are fastened to this shaft, as has been stated, and that any motion imparted to the rack 76 by the cams 82 will be translated to both the flange end tool slides and to the two tool units 50, 51 mounted for movement at the center of the work and between the two chuck units, as has been described. Thus it will be seen that the cams 82 control the movement of the two flange end tool slides and in complete unison therewith, the two center tool bars and their tools.

Stub end front tool slide

In Figures 1, 2, 9 and 10, but more especially in Figures 9 and 10 is shown the stub end front tool slide, in which 89 is a tool slide supporting base mounted on the lathe bed 1. 90 is a rack and roller arrangement for the tool feed, similar in all respects to the ones of the other slides, except that the teeth of the rack bar are at one side in this construction, instead of the rear edge, as in the other tool feeding units. 82a is the cam bar for this slide. A slide 91 is mounted for transverse travel in the supporting base and a second slide 92 is mounted for longitudinal travel in the slide 91, this second slide carrying the tools 93. There is a U-shaped opening 94 (Fig. 2) in the outward end of the slide 90, and an upward extension 95 on the supporting base, this extension extending up through the U-shaped opening in slide 91. A roller 96 is mounted on this extension and engages in a cam slot 97 on the underside of the extension 98 of the second tool slide 92.

A shaft 99, mounted in the supporting base, has a gear 100 keyed thereon and in engagement with the rack bar, and also a second gear 101 which drives the cross slide. To this end a shaft 102 is mounted in the supporting base above the shaft 99 and carries a gear 103 in mesh with the gear 101. A rack 104, mounted on the underside of the second or tool carrying slide 91, meshes with the gear 103. This rack has teeth of a width in excess of that of the gear 103, so as to permit the slide 91 and rack 104 to travel toward or away from the work without coming out of engagement with the gear. The crank-shaft A, which constitutes the work in this instance (Figs. 1, 3 and 5), has on the web sections, at each end of the shaft, a pair of lugs 105. These lugs serve as positioning and clamping devices for the shaft, and their utility will be set forth in the description of the operation of the machine to follow.

Before the rough crank-shaft forging is placed in the machine to be operated upon, the lugs 105 are machined to present a definite distance from the center of the shaft to the bottom of the lugs. This makes possible the coordinating of all the devices of the machine to the end that each and every shaft will be found in exact similar relationship to these devices and ready to be operated upon by them without further adjustments. With this understood, we are ready to load a shaft in the machine for a turning operation.

The operator places a crank-shaft in the hook of the crane, as shown in Figure 1. All the clamping devices and the tools being in retracted position, the crane is pushed endwise, the shaft entering the stub end chuck through the gap 106, (Fig. 3) in the ring gear web, passing the center tool bars and through a similar gap in the flange end chuck until the crane carriage comes against the stop 107, on the crane frame. At this position the crank-shaft is in exact position over the holding devices of the chuck, and in this position, is lowered until the lugs on the outer end webs come to rest on the seats 17 in the chuck bodies which locate the crank-shaft with regard to its vertical and transverse relationship to the clamps and tools and against the stop 38 which controls the longitudinal position of the shaft.

The two centers are now brought forward to enter the ends of the shaft and locked in the usual manner.

At this point the crane arm or hook is slightly lowered and swung to the rear to release it, and then retracted from the two chucks, as set forth in the pending application heretofore mentioned.

It is to be noted that the hook or crane arm reaches past the center of the two chucks and into the farthest chuck from the point of entry.

The clamping lever 22 in the stub end chuck is now brought down upon the work and the link 26 with its nut is brought forward into the bifurcated end of the clamp 22, and the nut tightened, the self-aligning disc in the clamping lever seating itself on the end web portion of the crank-shaft, as clearly shown in Figure 5, at the same time the tightening of the nut on link 26 causes a strain inward on the upper end of clamping dog 19, which is seated against one of the lugs 105, the other one of these lugs being against a stop 108 in the hardened positioning block 16. The continued tightening of the nut on link 26 results in the crank-shaft being locked in a position against rotation, at once rigid and secure. The same operation is now performed in the flange end chuck whose clamping elements are a duplicate of the stub end chucks. We now find the crank-shaft to be clamped in a rigid manner against movement in any direction, but lest there be torsional strains unresisted near the center of the work, the clamping device shown in Figure 6 is provided.

This clamping device is carried on a stud 26, lying in the inner wall of the stub end chuck, and the operator reaches inside of the stub end chuck and brings the arms 28 and 29 together over one of the connecting rod pins next to the center bearing and by the tightening of the nut 32 on the upper end of link 30, the semi-circular discs 35 take a perfect seat on the crank pin, and an ideal strain resisting combination of clamping devices is thus formed.

The tools may now be set in action and the turning of the shaft proceeded with.

The two slides carrying the tools, under the influence of their cams 82, start into the flange end, turning the flange and the number 1 bearing, the two sets of tools attacking the flange end from both sides at the same time until finished.

The two tool carrying bars of the center group of tools receive their power from the same cam, 82, as do the flange end tool slides, the rack bar 76 driving the shafts 60, carrying the two driving gears 61 and 78 of each unit. Thus the number 2 or center line bearing of the crank-shaft is turned in step with the flange end and the number 1 bearing.

The rear tool slide unit at the stud end is the same in construction as the two flange end units, having its cam 82 on the slide at the rear side of the bed; the same gear 78 meshing into a rack 77 on the slide, the only change being the shaft corresponding to one of the shafts 60, is, in this instance, only as long as the width of the slide.

The action of the front tool slide at the stub end is furnished from the cam 82 on the front slide.

The construction of this slide having been detailed heretofore, its movements will be described.

As the cam moves the rack upward the gear train starts the upper or tool carrying slide 92 longitudinally toward the flange end of the lathe. Coincident with this travel toward the flange end, the cam slot 97 in the extension 98 of the tool carrying or upper slide, engages the roller on the extension of the supporting base, the action of which is to cause the slide 91 to move in a transverse direction towards the work.

The tools at the start of their travel to the work, are outwardly and away from the work and toward the tailstock end of the lathe, so that their transverse travel in toward the work as well as their longitudinal travel causes them to reach the work just as the roller 96 reaches the straight part of the cam 97. The transverse travel having stopped with the tools in position to attack the work, the longitudinal travel continues and the stub end is turned as shown in Figure 2, where the tools are shown at the end of their travel.

While this action of the front tool has been taking place the rear tool is approaching the work and forms the shoulders, both sets of tools completing their work together in unison with the completion of the work on the shaft by the other tools.

The turning of the shaft now being completed, the tools are retracted, the clamps released, the crane brought forward into the chuck, the crane hook engaged under the crankshaft, and it is raised from the turning position and then moved longitudinally to the right out of the chucks until free, when it is removed from the hook and another placed ready to begin the cycle again.

It will be apparent that equivalent mechanical devices can be substituted for those shown and described without departing from the spirit of my invention. It will further be apparent that with a series of center line bearings in a special crankshaft, it will be readily possible to space the chucks, widen the tool supports and enter tools between the chucks to engage all line bearings located between them.

Having thus described my invention, what I claim as new and desire to secure by Letters Patent, is:—

1. In a crank-shaft lathe, comprising a bed, a pair of continuous, rotary, chucking devices constituting the sole driving and steadying devices for a shaft in said lathe and supports therefor, on said bed located centrally of the lathe and means for supporting a tool between the said chucking, driving and steadying devices so as to engage a piece of work held in the chucking devices, said means being supported by said supports of the chucking, driving and steadying devices.

2. In a crank-shaft lathe, comprising a bed, a pair of continuous, rotary, chucking devices constituting the sole driving and steadying devices for a shaft in said lathe and supports therefor, on said bed located centrally of the lathe, and means for supporting a tool from opposite sides of the lathe between the said chucking, driving and steadying devices so as to engage a piece of work held in the chucking devices, said means being supported by said supports of the chucking, driving and steadying devices.

3. In a crank-shaft lathe, a pair of rotary chucking devices located centrally of the lathe, and means for supporting a tool between the said chucking devices so as to engage a piece of work held in the chucking devices, fixed frames for said rotary chucking devices, said tool supporting means being bolted together with said frame.

4. In a crank-shaft lathe, a pair of rotary chucking devices located centrally of the lathe, and means for supporting a tool from opposite sides of the lathe between the said chucking devices so as to engage from opposite sides a piece of work held in the chucking devices, fixed frames for said rotary chucking devices, said tool supporting means being bolted together with said frame.

5. In a crank-shaft lathe, a pair of rotary chucking devices located centrally of the lathe, and means for supporting a tool between the said chucking devices so as to engage a piece of work held in the chucking devices, centers in said lathe for engaging the work therein, and tool supporting devices located also between both centers and the chucking devices.

6. In a crank-shaft lathe, a pair of rotary chucking devices located centrally of the lathe, and means for supporting a tool from opposite sides of the lathe between the said chucking devices so as to engage from opposite sides a piece of work held in the chucking devices, centers in said lathe for engaging the work therein, and tool supporting devices located front and back of the lathe and between the chucking devices and each of the centers, making in all six tool supporting devices.

7. In a crank-shaft lathe, a pair of rotary chucking devices located centrally of the lathe, and means for supporting a tool between the said chucking devices so as to engage a piece of work held in the chucking devices, centers in said lathe for engaging the work therein, tool supporting devices located also between both centers and the chucking devices, and means operated from a common source for advancing and retracting all tools in said supporting devices simultaneously.

8. In a crank-shaft lathe, a pair of rotary chucking devices located centrally of the lathe, and means for supporting a tool from opposite sides of the lathe between the said chucking devices so as to engage from opposite sides a piece of work held in the chucking devices, centers in said lathe for engaging the work therein, and tool supporting devices located front and back of the lathe and between the chucking devices and each of the centers, making in all six tool supporting devices, and means operated from a common source for advancing and retracting all tools in said supporting devices simultaneously.

9. In a crank-shaft lathe, means for supporting and revolving a crank-shaft to be turned from a position between the ends of the shaft, and at a plurality of points along the shaft, cutting tools, and means for feeding them so as to turn all of the line bearings of said crank shaft at a single operation, some of the tools operating between the supporting and revolving devices, and some outside of the said devices.

10. In a crank-shaft lathe, means for supporting and revolving a crank-shaft to be turned from a position between the ends of the shaft, and at a plurality of points along the shaft, cutting tools, and means for feeding them so as to turn all of the line bearings of said crank shaft at a single operation, some of the tools operating between the supporting and revolving devices, and some outside of the said devices, said tools being so arranged as to engage the line bearings of said crank-shaft from opposite sides with relation to each line bearing.

11. In a crank-shaft lathe, a center drive chucking device comprising a frame, a ring gear held in said frame, a crank-shaft pin engaging means retained in said ring gear comprising a plurality of jaws, and means for securing them together, and crank-shaft web engaging means arranged to engage the said web at more than two points.

12. In a crank-shaft lathe, a center drive chucking device comprising a ring gear, and crank-shaft pin engaging means supported in said ring gear and having a plurality of jaws, means for bringing and holding them together over the said pin, said jaws having rocking engaging elements therein arranged to take a compensated position against the pin when the jaws are brought together.

13. In a crank-shaft lathe, a center drive chucking device comprising a ring gear, and crank-shaft web engaging means supported therein and having a member in which the web is seated, a member movable to engage the web above said seat, a stop in connection with said seat, and means for forcing a prepared portion of the web against said stop when the movable member is brought into engagement with the web.

14. In a crank-shaft lathe, a center drive chucking device comprising a ring gear, and crank-shaft web engaging means supported therein and having a member in which the web is seated, a member movable to engage the web above said seat, a stop in connection with said seat, and means for forcing a prepared portion of the web against said stop when the movable member is brought into engagement with the web, said movable member having means thereon to engage the web at a plurality of points.

15. In a crank-shaft lathe, a center drive chucking device comprising a ring gear, and crank-shaft web engaging means supported therein and having a member in which the web is seated, a member movable to engage the web above said seat, a stop in connection with said seat, and means for forcing a prepared portion of the web against said stop when the movable member is brought into engagement with the web, said movable member having means thereon to engage the web at a plurality of points, said means having a rocking movement in its mounting on said movable means.

16. In a lathe, a tool slide comprising a frame, a tool carrying bar mounted to slide in said frame, means for driving the bar, and means for exerting spring pressure between the bar and the frame at all positions of the bar in the frame, said means comprising a compounding bell crank lever linked to the bar, and pivotally secured to the frame, and spring means for acting on said lever.

17. In combination in a lathe, a bed, a plurality of tool slides on said bed having tool carrying members movable to advance and retract tools from the work, cam means for operating one of the tool slides, having power transmission means between it and the slide, and power transmission means for the other slide operatively connected with the power transmission means first mentioned.

18. In combination in a lathe, a bed, a plurality of tool slides on said bed having tool carrying members movable to advance and retract tools from the work, a rack and pinion feed for one of the slides, means on the bed of the machine to operate the same, and rack and pinion means for operating the other tool slide, the pinion thereof being connected by a shaft with the pinion for the slide first mentioned.

19. In a crank-shaft lathe, a bed, means thereon to support and revolve a crank-shaft intermediate its ends, tool feeding devices located and operable to feed appropriate tools for turning the stub end and also the flange end of said shaft, and means for operating said tool feeding devices simultaneously, and further tool feeding means also operated simultaneously with the devices first above mentioned for turning a plurality of line bearings of said shaft.

20. In a crank-shaft lathe, a pair of rotary chucking devices located centrally of the lathe, and means for supporting a tool between the said chucking devices so as to engage a piece of work held in the chucking devices, fixed frames for said rotary chucking devices, said tool supporting means being bolted together with said frames, and means for charging a shaft endwise into said chucking devices.

WILLIAM F. GROENE.